(12) United States Patent
Magarelli et al.

(10) Patent No.: US 8,270,398 B2
(45) Date of Patent: Sep. 18, 2012

(54) SYSTEM AND METHOD FOR SIGNAL PROCESSING

(75) Inventors: Romolo Magarelli, Woodbridge (CA); Rakesh Thakor Patel, Mississauga (CA); Eric Fankhauser, Burlington (CA); Daniel G. Turow, Burlington (CA)

(73) Assignee: Evertz Microsystems Ltd., Burlington (CA)

( * ) Notice: Subject to any disclaimer, the term of this patent is extended or adjusted under 35 U.S.C. 154(b) by 273 days.

(21) Appl. No.: 11/738,675

(22) Filed: Apr. 23, 2007

(65) Prior Publication Data

US 2007/0248087 A1    Oct. 25, 2007

Related U.S. Application Data

(60) Provisional application No. 60/793,716, filed on Apr. 21, 2006.

(51) Int. Cl.
*H04L 12/50* (2006.01)
*H04L 12/28* (2006.01)

(52) U.S. Cl. .......... 370/360; 370/419; 370/422
(58) Field of Classification Search .......... None
See application file for complete search history.

(56) References Cited

U.S. PATENT DOCUMENTS

| | | | | |
|---|---|---|---|---|
| 5,389,963 A | * | 2/1995 | Lepley et al. | 725/144 |
| 6,108,308 A | * | 8/2000 | Flavin et al. | 370/238 |
| 6,154,154 A | * | 11/2000 | Suzuki et al. | 341/61 |

* cited by examiner

*Primary Examiner* — Nittaya Juntima
(74) *Attorney, Agent, or Firm* — Bereskin and Parr LLP/S.E.N.C.R.L., s.r.l.

(57) ABSTRACT

A plurality of systems for routing signals are described. The system includes a cross point switch that can couple any one of a plurality of input terminals to a plurality of output processor terminals. Signals received at the input terminals are coupled to corresponding output terminals and are processed by output modules. The resulting processed signals are provided at output terminals. In some embodiments, one or more input modules are provided to process input signal prior to routing through the cross-point switch.

14 Claims, 3 Drawing Sheets

SYSTEM AND METHOD FOR SIGNAL PROCESSING

This application claims the benefit under 35 USC 119(e) of U.S. Provisional Patent Application Ser. No. 60/793,716, filed Apr. 21, 2006 and incorporated herein, in its entirety, by this reference to it.

FIELD

This invention relates to systems and methods for processing signals.

BACKGROUND

In many signal processing systems a plurality of input signals are received and some or all of these signals are processed to form one or more output signals. The output signals are provided to one or more output devices for further processing or reproduction. In systems where digital domain processing is required it is common to receive the digital signal and/or an analog input signal (which is then converted to a digital signal), pre-process and route and process the digitized signals. As technology advances, data signals contain an increasing amount of information and increasing numbers of signals are processed to form output signals. For example, television signals have increasingly higher resolutions and multiple of signals are often combined on a single display.

As the number and complexity of the input signals increases it can become increasing difficult to successfully route the digitized versions of the input signals to appropriate signal processors. For example, in one existing system, a plurality of input signals are received and are potentially initially digitized and packetized to provide a plurality of packetized signal streams each of which corresponds to a number of the input signals. The packetized streams are provided to a packet router, typically on a common transmission line. The packet router is configured to route a subset of signals to each of a number of output devices. Each output device then process each of the packetized signals that it receives to produce an output signal.

Such systems have bottlenecks associated with the initial pre-processing process in terms of processor speeds, overall memory bandwidth requirements, memory controller speeds, memory sizes and memory interfaces. In addition, such systems have bottlenecks associated with the transmission capacity of the transmission lines carrying the packetized input signals, which may be time division multiplexed communication lines. There are also bottlenecks in the packet router associated with processor speeds, overall memory bandwidth requirements, memory controller speeds, memory sizes and memory interfaces. There are bottlenecks associated with the data capacities of the communication links between the packet router and the output cards which may also be time division multiplexed or otherwise shared communication links. Finally, the output cards have similar bottlenecks as the input cards and the packet processors in terms of processor speeds, overall memory bandwidth requirements, memory controller speeds, memory sizes and memory interfaces.

There is a need for a simple and low cost system that alleviates these system bottlenecks and allows for a plurality of input signals to be selected and routed to one or more output processors each of which processes the input signals selected in relation to that output processor and each of which provides one or more output signals based on the input signals coupled to it.

BRIEF DESCRIPTION OF THE DRAWINGS

The present invention will be described by way of example, with reference to the drawings, in which.

DESCRIPTION

Figure 1:
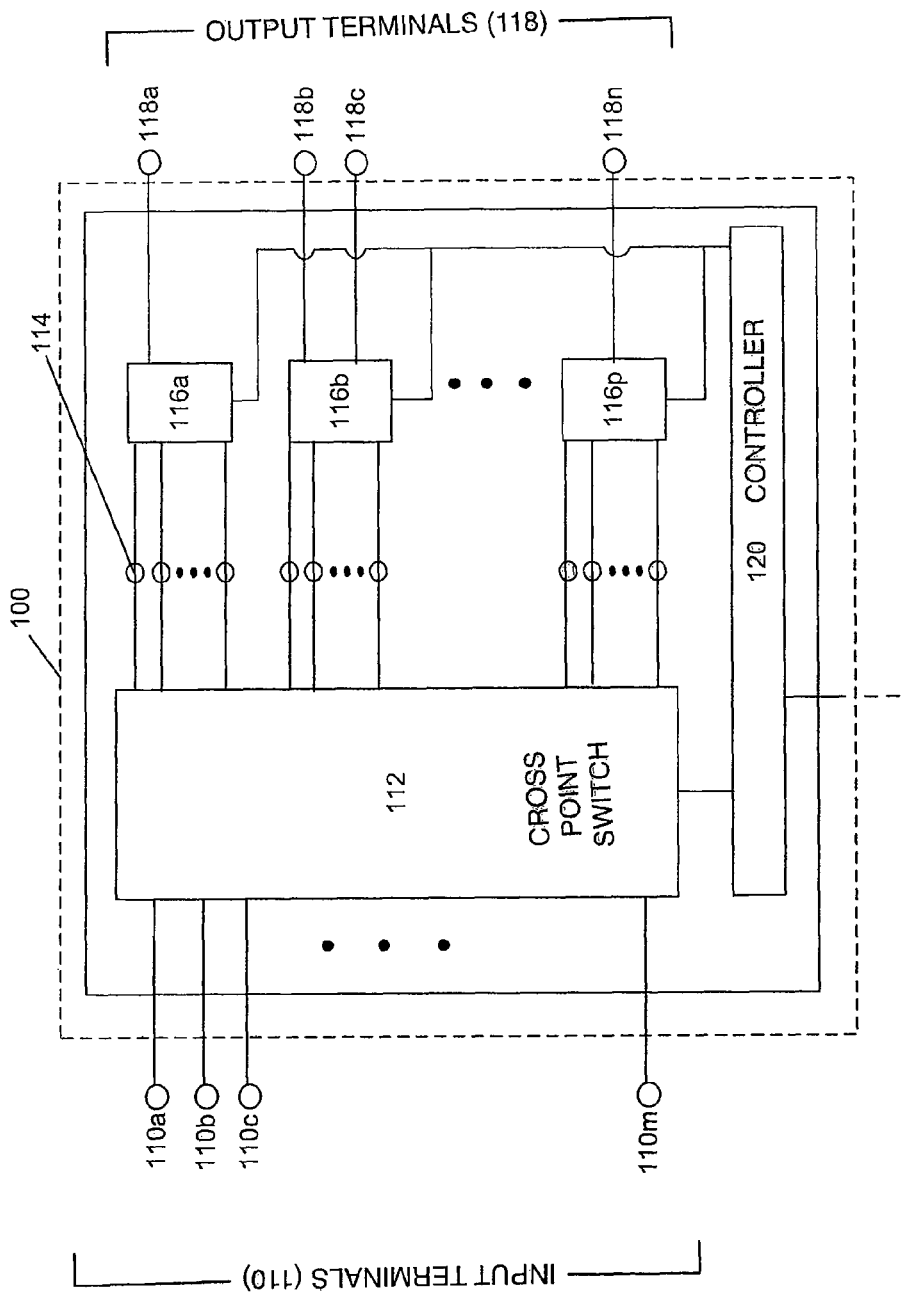
FIG. 1 illustrates an example system according to the present invention.

Reference is first made to FIG. 1 which illustrates a first exemplary system 100 according to the present invention. System 100 includes a plurality of frame input terminals 110, an electrical cross point switch 112, a plurality of output processors 116. Each of the output processors 116 is coupled to the electrical cross point switch 112 at a plurality of processor input terminals 114. Each of the processors 116 also has one or more frame output terminals 118. The electrical cross point switch 112 is coupled to each of the input terminals 110 and receives an input signal, which may be an electrical, optical or radio frequency (RF) signal at one or more of the input terminals 110. The electrical cross point switch 112 can be configured to couple every one of the input terminals to any one or more of the processor input terminals 114. Cross-point switch 112 is a high bandwidth crosspoint switch capable of routing high bandwidth signals to any one or more of the processor input terminals. By utilizing this architecture processing speed constraints, interface speed constraints, routing constraints and overall memory bandwidth/controller speeds/memory sizes/memory interface constraints are mitigated.

Controller 120 may operate under the control of an external master controller or in response to signals received from a user, or both. Controller 120 controls the configuration of cross point switch 112 to switch a desired sub-set of input signals to each of the output processors 116. Controller 120 may also control and monitor the operation of each of the output processors 116.

Each of the output processors 116 is configured to receive one or more selected RF, optical or electrical input signals at the corresponding output processor input terminals. Each of the output processors processes the selected input signals coupled to it and produces one or more output signals at frame output terminals 118.

Signal processing device 100 is a modular system. For example each of the output processors is configured to operate independently of the remaining output processors and provides its output signals at the corresponding frame output terminals 118 independently of the other devices. Input terminals 110 may be built into one or more input modules, each of which is designed to receive a particular kind of signal. For example, an input module may be provided to receive a set of video input signals while another input module may be provided to receive data signals while another input module may be provided to receive data signals and while another input module may be provided to simultaneously receive audio signals. Each of the output modules may require one or more of the input signals in order to produce its corresponding output signal (internal test patterns etc are possible in the input modules). The cross point array couples each required input signal to each output module.

The signal flow between the frame input terminals 110 and output processor input terminals 114 operates in the electrical domain and each signal is switched through the cross point array in its original format, as received at the frame input terminals 110. For example, video input signals may be received in a variety of formats. For example the input signals may be received as baseband NTSC, or ATSC signals, as L-Band frequency signals and in many other frequencies and formats. Audio signals may be received as digital audio signals, as 1 volt peak-to-peak signals or in other formats. Data signals may be received according to various standards that specify different voltage levels, frequencies and other signal characteristics.

The cross-point switch 112 does not distinguish between different types of signals and is operable to switch any input signal to any one or more of the signal processor input terminals 114.

The output modules may have a variety of functions. For example one or more of the output modules may be a multi-image viewer which receives a plurality of video, audio, data signals and then combines the signals into a single video signal (potentially with embedded audio (such as an NTSC or ATSC signal). Controller 120 configures the cross-point switch 112 to route the required audio, video and data signals to the output processor. Controller 120 also configures the output processor to form the output video signal as requested by the master controller or the user. The resulting output signal is reproduced using an audio/video reproduction device.

Figure 2:
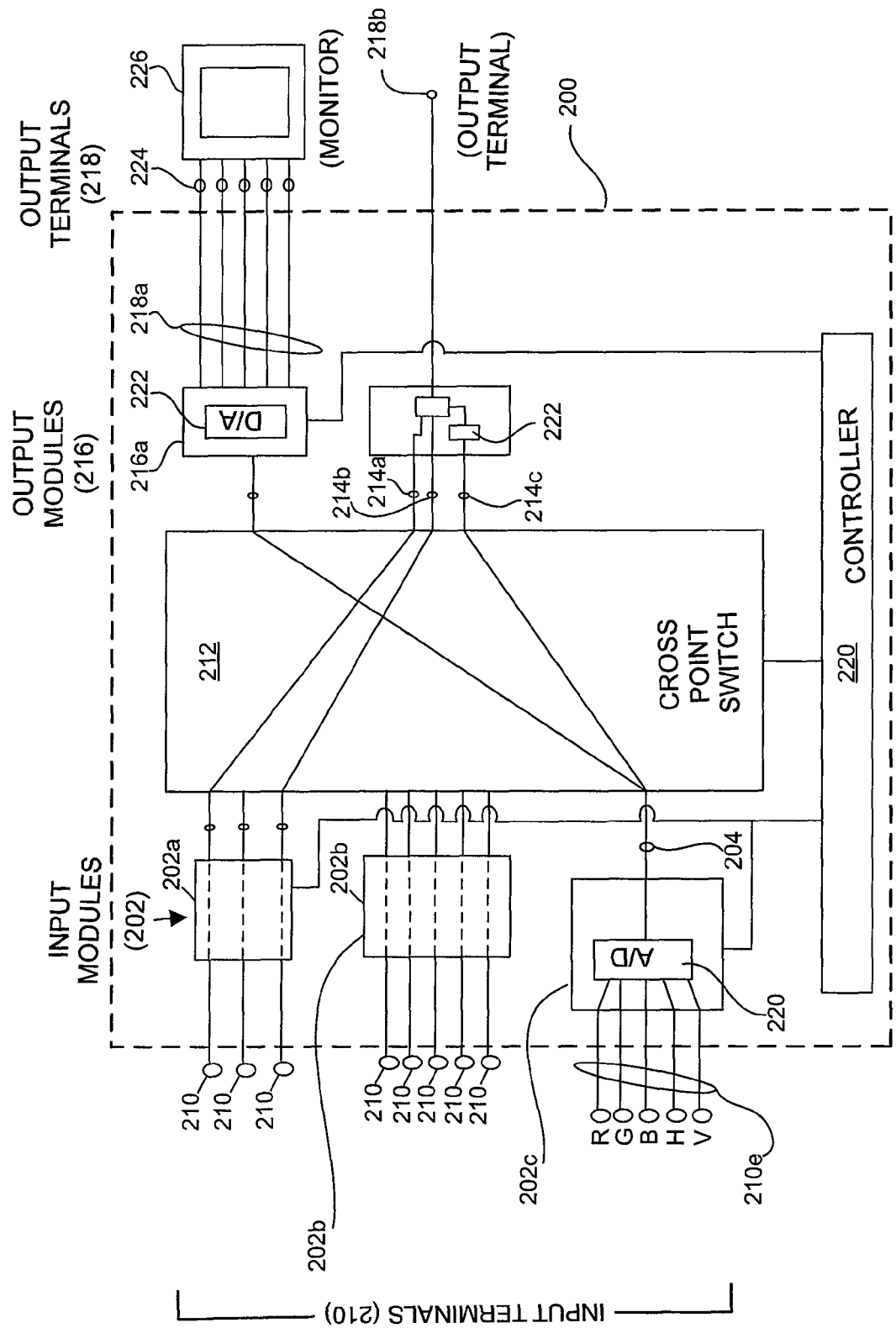
FIG. 2 illustrates another example system according to the present invention.

FIG. 2 illustrates the configuration of another system 200. Components of system 200 that correspond to components of system 100 are identified by similar reference numerals.

System 200 has a plurality of modular input modules 202. Each input module 202 includes a plurality of input terminals 210.

Input module 202a is an audio input module that has a plurality of audio input terminals that are coupled to the cross-point switch 212. The audio input terminals may be any type or any combination of types of audio connectors. For example, these terminals may be RCA, BNC or other types of connectors.

Input module 202b is a video input module that is configured to receive video signals. Video input module 202b may have a variety of input terminals suitable for receiving video signals. In a professional or commercial video processing environment, the video input terminals 210 may comprise co-axial terminals, which have a single signal conductor. Other video input terminals may have multiple signal conductors. Optical video interfaces are also possible. Each of these conductors is coupled to the cross-point switch and each of them is separately coupled to an output processor that requires the video signal. Some input terminals may have a dozen or more conductors and each of these conductors is separately coupled to the cross-point switch.

Input module 202c illustrates an alternative to this arrangement. One system of transmitting video signals includes five analog components labeled R: red, G, green, B: blue, H: horizontal and V: vertical. The acronym RGBHV can be used to refer to this system. Five separate cables are used to couple devices that transmit and receives RGBHV video signals. Input module 102c has five input connectors—one each for the R, G, B, H and V components which together form a single video signal input terminal 210e. The input module 202c converts the five analog components into a combined digital signal using a high speed analog to digital converter 220. The combined digital signal is coupled to a cross-point switch input terminal 204. Cross-point switch 212 switches the combined digital signal to any output card that requires the video signal. For example, output module 216a includes a high speed digital to analog converter 222 that recreates the RGBHV signal on five output connectors 224 that form one output terminal 218a. The output connectors 224 are coupled to a monitor 226 for display.

Input module 202c is an example of an input module that pre-processes one or more input signals to produce a modified or combined signal (or signals) which are then routed through the cross-point switch 212. The use of input modules cards that provide signal processing functions allows efficient use of the input signals and the cross-point switch.

The use of input module 202c to form the combined digital signal and output module 216a to recreate a RGBHV signal allows the single combined digital signal to be routed through cross-point switch 212. The combined digital signal may be a digitally sampled and time division multiplexed representation of the RGBHV signal.

Figure 3:
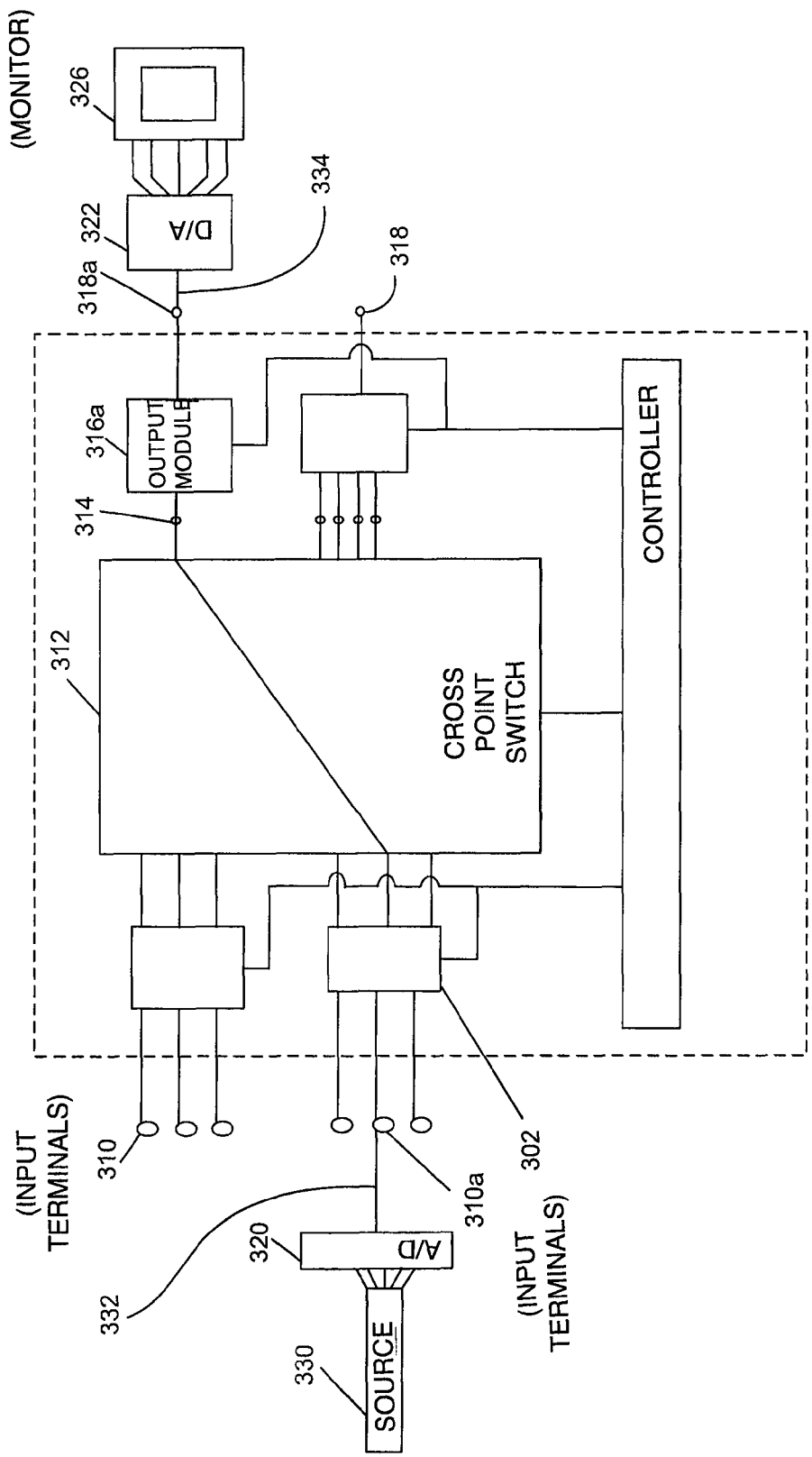
FIG. 3 illustrates another example system according to the present invention.

Reference is next made to FIG. 3, which illustrates another system 300. In FIG. 3 an analog to digital converter 320 receives an RGBHV signal from a signal source 330 and creates a combined digital signal. The combined digital signal is coupled through a single cable to input terminal 310a. Cross-point 312 couples the combined digital signal through an output module 316a to an output terminal 318a. From terminal 318a, the combined digital signal is transmitted to a digital to analog converter 322 that recreates the RGBHV video signal. The RGBHV video signal is transmitted to a monitor 326 for display. The configuration of FIG. 3 allows an RGBHV video signal to be efficiently transmitted in the form of a combined digital signal from A/D converter 320 through system 300 to D/A converter 322 on single conductor cables 332 and 334. Single conductor cables can thus be used to replace the five cables normally required to transmit a RGBHV video signal and system 300, which is capable of coupling a wide variety of signals, can be used to switch the RGBHV signal (in the form of a combined digital signal) to any one or more output modules and digital to analog converters.

The use of systems 100, 200 and 300 is not limited to switching and processing any particular type or types of signals. A system according to the invention could be used to switch telecom/datacomm signals by installing appropriate input terminals (or input modules) and output modules. The output modules may be configured to process such telecom/datacomm signal to drop, add or multiplex components of the signals to produce modified output signals corresponding to one or more of the input telecom/datacomm signals. Furthermore, such signals could be combined with other signals coupled to the system to provide output signals.

The present invention has been described here by way of example only. Various modification and variations may be made to these exemplary embodiments without departing from the spirit and scope of the invention.

We claim:

1. A modular system for processing signals comprising:
a plurality of frame input terminals for receiving a plurality of input signals;
a plurality of input modules coupled to the frame input terminals to receive the input signals;
a cross point switch coupled to the input modules at a plurality of cross point switch input terminals to receive the input signals, wherein the cross point switch is configurable to couple one or more of the input signals to each of a plurality of processor input terminals;

a plurality of output modules, each output module including one or more output processors, wherein each of at least some of the output processors is coupled to one or more of the processor input terminals to receive one or more of the input signals, and wherein each output module has one or more frame output terminals; and a controller coupled to:

the cross point switch to couple at least some of the frame input terminals to one of the processor input terminals whereby the input signals received at the frame input terminals are provided at the corresponding processor input terminals; and at least one of the output processors to controllably configure the at least one output processor to processor input signals received at the one or more processor input terminals of the at least one output processor to provide one or more output signals at the one or more frame output terminals of the at least one output processor.

2. The system of claim 1 wherein at least one of the input modules is configured to process one or more input signals coupled to the at least one input modules and to provide a processed version of the input signals to the cross point switch.

3. The system of claim 1 wherein at least some of the frame input terminals are configured to receive radio frequency signals and at least some of the frame input terminals are configured to receive optical signals.

4. The system of claim 1 wherein at least some of the frame input terminals are configured to receive data signals.

5. The system of claim 1 wherein at least some of the frame input terminals are configured to receive video signals.

6. The system of claim 1 wherein at least some of the frame input terminals are configured to receive video signals.

7. The system of claim 1 where the controller is coupled directly to the cross point switch and to at least one of the output processors.

8. The system of claim 7 wherein at least one of the input modules is configured to process one or more input signals coupled to the at least one input module and to provide a processed version of the input signals to the cross point switch.

9. The system of claim 7 wherein at least some of the frame input terminals are configured to receive radio signals and at least some of the frame input terminals are configured to receive optical signals.

10. The system of claim 7 wherein at least some of the frame input terminals are configured to receive data signals.

11. The system of claim 7 wherein at least some of the frame input terminals are configured to receive video signals.

12. The system of claim 7 wherein at least some of the frame input terminals are configured to receive audio/video signals.

13. The system of claim 1 wherein at least one of the input modules is configured to process one or more input signals of a selected signal type and at least one of the output processors is configured to process signals of a corresponding signal type.

14. The system of claim 1 wherein at least one of the input modules is configured to process one or more input signals of a selected signal type and at least one of the output processors is configured to process signals of the selected signal type.

* * * * *